July 20, 1954 F. A. KROHM 2,684,261
FRICTION JOINT
Filed May 12, 1948

INVENTOR.
FRED A. KROHM
BY
Charles S. Penfold
ATTORNEY

Patented July 20, 1954

2,684,261

UNITED STATES PATENT OFFICE 2,684,261

FRICTION JOINT

Fred A. Krohm, Gary, Ind., assignor to Productive Inventions, Inc., a corporation of Indiana Application May 12, 1948, Serial No. 26,584

2 Claims. (Cl. 287—126)

This invention relates to mirrors and other accessories adapted for use outside the body of a vehicle and supporting devices therefor and particularly to a novel construction and arrangement designed to facilitate the installation and use thereof.

An object of the invention is to provide an improved vision device with resilient means adapted to facilitate assembly of parts and to hold parts of the assembly securely in operative relationship without the necessity of manufacturing such parts to difficult and costly manufacturing tolerances.

Another object of the invention is to provide an improved mirror device for positioning the mirror and frame therefor in angular adjustment with respect to the vehicle and for maintaining the selected position.

Another object of the invention is to provide a mirror device with an improved universal joint connection between the mirror member and the supporting arm therefor whereby the mirror member may be angularly adjusted in any plane with respect to the supporting arm and be maintained in the selected position.

Another object of the invention is to provide a mirror device with an improved rotatable universal friction joint of simple, efficient construction to maintain the mirror in a selected position.

Another object of the invention is to provide a rotatable friction joint in which the friction members allow rotation under predetermined frictional resistance and frictionally prevent axial displacement under operating conditions.

Another object of the invention is to provide a rotatable friction joint in which the frictional resistance to axial movement after assembly is in excess of the frictional resistance to axial movement in the assembling operation.

This application is a continuation in part of my copending application Serial No. 792,478, filed December 18, 1947, now abandoned.

Figure 1:
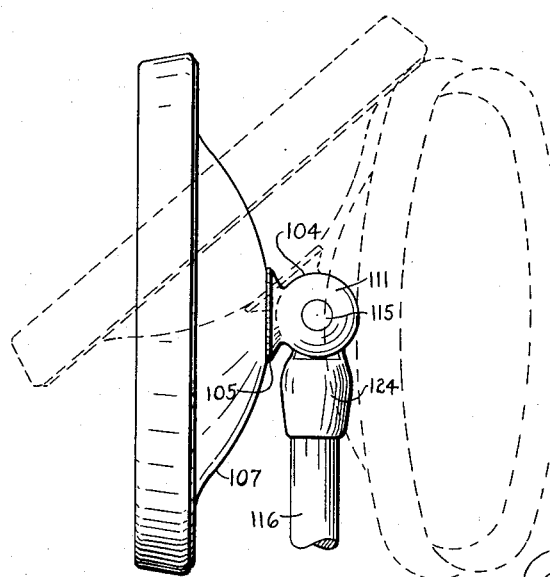
Figure 1 is a side view of an assembly comprising a mirror member, and a universal joint connecting member illustrating the universal adjustability of the mirror member in any plane relative to the mirror supporting arm.

Conventional ball-and-socket joints are notoriously difficult to hold in a predetermined position in service. The frictional contact usually is limited and it is difficult to apply to the contact a predetermined and adequate spring pressure which can be maintained without fatigue. This is particularly important in side-view mirrors subjected to car vibrations. The conventional ball-and-socket joint is of course vulnerable to such vibrations regardless of their direction, since in the conventional universal joint when relied upon singly there is but one frictional contact depended upon for the universal movement; the universality of the joint, which gives it utility, also exposes it, with equal universality, to vibrations, regardless of their direction.

The universal friction joint and parts thereof exemplified in Figures 1 through 7, comprises a friction hinge joint and a rotatable friction joint.

The friction hinge joint includes a bifurcated integral hinge member 104 with a circular exterior abutting flange 105 and a reduced circular axial portion 106 extending through a suitable opening in the rear wall 107 of the shell carrying the mirror and is secured thereto against relative movement by an upset flange 108 bearing against a washer 109 to clamp the rear wall 107 of the mirror shell between the exterior flange 105 and the washer 109. This washer is preferably of a relatively large size and serves in the dual capacity of reenforcing the shell and as a friction element to assist in preventing relative movement between the hinge and shell.

The bifurcated member 104 of the hinge joint comprises furcations or legs 110 and 111 forming a straight sided slot 112 which receives a complementary round flat tongue 113 of a fitting 114. The exterior surfaces of the legs are preferably of a curvature corresponding to that of the tongue portion so as to form a generally spherical head or knob. The hinge member and fitting are connected by a rivet or pintle 115 for pivotal movement about an axis at right angles to the longitudinal axis of the upper extremity of a curved mirror supporting arm 116. A lower end of the supporting arm 116 is provided with a suitable clamp whereby the mirror can be easily and quickly attached to a vehicle door. The leg 110 is provided with an aperture 117 and the tongue portion 113 with an aperture 118 of a diametrical size corresponding to aperture 117 to receive a shank portion 119 of the rivet. The other leg 111 is provided with an aperture 120 of a size somewhat less than apertures 117 and 118 and receives a reduced portion 121 of the rivet. The apertures 117 and 120 are preferably countersunk in order that the ends of the rivet may be upset in the countersinks and conform to the general curvature of the spherical head to present a pleasing design. One side of the tongue 113 is preferably provided with an annular recess 122 within which is disposed a friction cup washer 123 for concealment with a portion of its convex face engaging the planar surface on the leg 111. With this arrangement the clamping pressure, principally between the planar surface of the leg 110 and tongue 113, may be predetermined to maintain the mirror member in any desired angular position, within its range of pivotal movement, with respect to the fitting 114. Obviously, a pair of washers in lieu of one could be employed, and if found desirable, a screw could be substituted for the rivet 115 but the device would not be theftproof. The parts may be reversed so that the hinge member 104 may be provided with a tongue and the fitting 114 with a bifurcation. Furthermore, the recess for the washer could be provided in the leg 111 instead of in the tongue, or in both.

Figure 2:
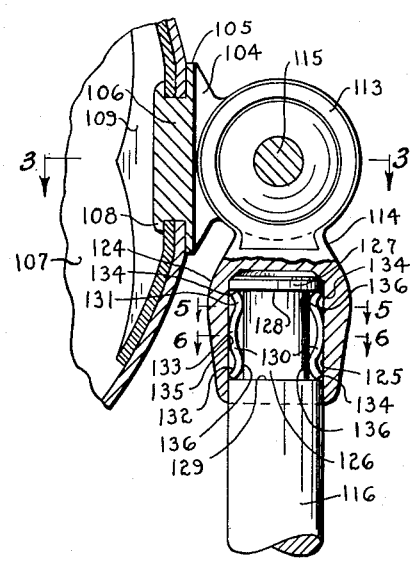
Figure 2 is an enlarged sectional view of the universal joint connecting member connected to the mirror member and the mirror supporting arm.
Figure 3:
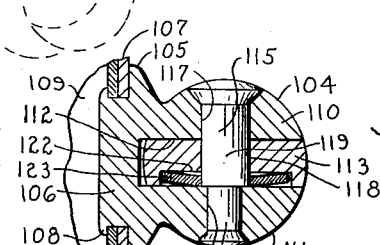
Figure 3 is an enlarged sectional view taken substantially on line 3—3 of Figure 2.

The rotatable friction joint between the fitting and arm will now be described. The fitting 114, which constitutes a component of the hinge joint, is preferably constructed of stainless steel and includes an integral slightly tapered portion 124 provided with a cylindrical bore, socket, or cavity 125 which receives the upper extremity of the supporting arm 116 as illustrated in Figure 2. The wall of the bore is generally rough due to the annular serrations or ridges that result from the boring operation, and this factor may be taken advantage of as will be subsequently described. The design of the portion 124 is in harmony with the remainder of the fitting and the hinge member to enhance the general overall appearance of the joint.

Figure 4:
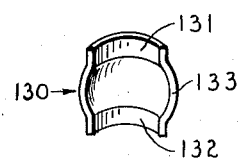
Figure 4 is an enlarged pictorial view of one of two modified spring friction members shown in Figures 2, 5, 6 and 7.
Figure 5:
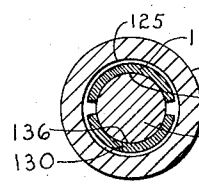
Figure 5 is an enlarged transverse sectional view of the rotatable friction joint taken substantially as indicated by the line 5—5 of Figure 2.

The supporting arm 116 is preferably bent to an arcuate shape and is preferably solid and round in cross-section throughout its entire length. Its upper extremity is grooved to form a reduced cylindrical portion or neck 126. This neck is spaced inwardly from the pilot end 127 of the arm and terminates in a pair of shoulders 128 and 129. The end 127 is chamfered as depicted so as to assist in guiding the arm into the bore. The neck portion 126 is of a length somewhat less than the depth of the bore so as to conceal a plurality of corresponding friction producing members 130 associated with the parts. The members 130 are preferably constructed of some desirable resilient material, such as bronze, and are generally semi-cylindrical in shape as shown in Figure 4. Each member includes a pair of substantially identical arcuate end bearing portions 131 and 132 of a curvature substantially corresponding to the curvature of the cylindrical neck portion 126 of the arm so as to normally engage the neck through the arcuate lengths of the bearings. The end bearings more or less constitute circular ring sections. Each resilient member also includes a bearing portion 133 intermediate the end bearings. This intermediate bearing is of a size larger than the end bearings and is preferably generally arcuate in cross-section and more or less curved or elliptical in longitudinal section.

Figures 7, 8:
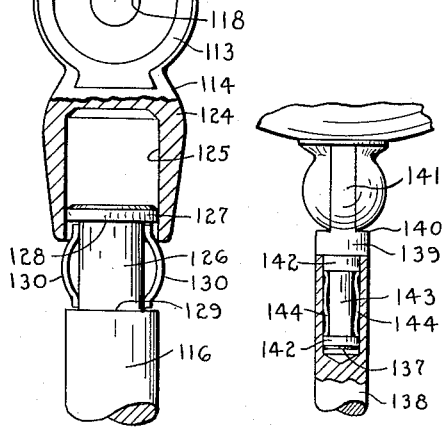
Figure 7 is an enlarged vertical sectional view showing the method of assembling the spring friction members, the connecting member and the mirror supporting arm.
Figure 8 is a view of another form of a rotatable friction joint interposed between a supporting arm and a mirror member.

As exemplified in Figure 7, the parts are assembled by placing the friction producing members 130 about the neck 126 and then inserting the pilot end 127 of the arm and the end bearings 131 of members 130 into the bore 125 of the fitting 114, whereupon the arm and members are pressed or rammed with considerable force into the assembled position with the fitting as depicted in Figure 2. The shoulder 129 on the arm serves as an abutment for the resilient members 130 as the arm is driven into place and the inward movement of the arm is limited by the pilot end of the arm engaging the end wall of the bore. It will be noted that the cylindrical space about the neck within which the friction members are arranged is of a size sufficient to permit such members to be distorted when rammed into the bore 125. The cylindrical portions of the arm adjacent either end of the neck 126 finds support on the wall of the bore 125 to provide a well stabilized construction.

Figure 6:
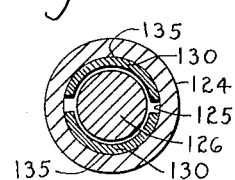
Figure 6 is an enlarged transverse sectional view of the rotatable friction joint taken substantially as indicated by the line 6—6 of Figure 2.

As the parts are being assembled the intermediate bearing portions 133 are compressed to cause distortion and elongation of the members to an extent whereby the end bearing portions 131 and 132 will bend outwardly so that the end arrises thereof will intimately engage the bore at areas 134 as illustrated in Figure 2, and since the members are of a softer material than the fitting, the annular serrations or other imperfections in the bore will cooperate with the said end arrises and also cooperate and bite into the outer surfaces of the intermediate bearings 133 as indicated at 135 to increase the friction between the arm 116 and fitting 114 and yet allow for the relative rotational movement desired between them, and at the same time assist in preventing relative longitudinal movement therebetween. It is of course to be understood that insofar as the present invention is concerned it is not necessary to utilize the serrations or arrange the friction members so that the end arrises engage the bore. It will be evident that as a result of such compression, the inner surfaces of the end bearing portions 131 and 132 will intimately engage the intermediate neck 126 at longitudinally spaced areas 136 remote from the shoulders 128 and 129 and spaced inwardly from the contact areas 134 as exemplified in Figures 2 and 5. Due to the fact that each friction member engages the rough bore at three longitudinally spaced areas as compared to the two engaging the neck, the friction members are preferably held in substantially stationary positions so that the fitting and members may be rotated with respect to the arm. Obviously, the friction members may move relative to the fitting or arm. The intermediate bearing portions 133 of the friction members are deformed from their original shape so that the outer surfaces thereof conform to the curvature of the bore as depicted in Figure 6, and preferably engage the latter over an area greater than any of the other contact areas.

It will be manifest that the assembled friction joints illustrated in Figure 1 are rotatable about the axis of the pintle and the mirror supporting arm, respectively. The frictional resistance in the joints is sufficient to permit the mirror member to be manually moved to and maintained in any selected operating position about either axis.

A new and unexpected result is achieved by the design and construction of the resilient members 130 in relation to radial frictional pressures within the assembly in that the assembled friction joint may be rotated manually about the arm but cannot be disassembled except with the use of tools exerting axial pressures substantially in excess of manual pressures. Advantages of this unique friction joint reside in concealing the friction producing means and predetermining the extent or measure of friction so that no external manually controlled means are required for adjusting the friction. Simplicity of design and construction, durability, and economy of manufacture are additional attributes of the invention.

The universal friction joint illustrated in Figure 8 operates substantially in the same manner as the joint exemplified in Figure 2, but differs therefrom by modifying the arrangement so that an axial bore 137 is provided in the upper extremity of a mirror supporting arm 138 with a shank portion 139 of a fitting 140 received in the bore 137. The fitting is provided with a portion 141 which cooperates with a hinge member of the type depicted in Figure 3. The shank portion of the fitting includes spaced bearing portions 142 and an intermediate reduced cylindrical neck portion 143, with the bearings 142 finding support in the bore for stability. It has been found desirable to make the neck portion and the friction producing members 144 here employed slightly longer for the reason that the cross-sectional dimensions of the parts are somewhat less than the construction illustrated in Figure 2. It will be noted that the exposed cylindrical portion of the shank 139 is preferably of the same diameter as the diameter of the arm so that it appears to be integral or a continuation of the arm. This particular arrangement also allows the mirror device to be rotated about the supporting arm and automatically held to any operating position desired.

Figure 9:
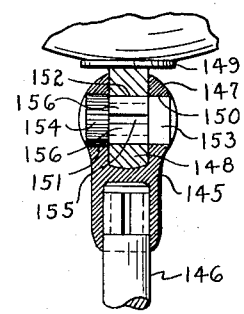
Figure 9 is a sectional view of an additional form of a universal joint connecting a mirror member and a mirror supporting arm.

The modification exemplified in Figure 9 operates in a manner similar to those above described and embodies substantially the same type of friction joint for the hinge as is used on the supporting arm. This construction includes a fitting 145 provided with a bore for receiving the upper extremity of a supporting arm 146, and a generally spherical head portion 147 provided with a slot or notch receiving a tongue portion 148 formed on a hinge member 149 permanently secured to a mirror shell or backing. One side of the spherical head is provided with an aperture 150 and the other side of the head with an aperture 151 coaxial with aperture 150. The tongue portion 148 is provided with an aperture 152 of a diametrical size substantially corresponding to and coaxial with the apertures 150 and 151. A pintle member 153 extends through the apertures referred to and one end of the pintle is preferably provided with longitudinally extending serrations or ridges 154 which are adapted to be forceably pressed into intimate engagement with the wall defining the aperture 151 so as to permanently lock the parts in assembly and prevent rotation of the pintle relative to the fitting. The pintle is provided with an intermediate reduced cylindrical neck portion 155. A pair of friction producing members 156 are disposed about the neck portion and serve to increase the friction between the hinge member 149 carried by the mirror shell and the fitting 145. It will be noted that the friction producing members 156 exert radial pressures against the pintle or pivot 153 whereas in the other modification illustrated in Figure 3, the lines of pressure are parallel to the axis of the pivot or rivet. As clearly illustrated the arm 146 is connected to the fitting 145 in the same way that arm 116 is connected to fitting 144.

Modifications and changes in details will occur to those skilled in the art without departing from the spirit and scope of my invention, but having set forth the objects and nature thereof, and having shown and described constructions embodying the principles of my invention, what I claim as new and useful and of my own invention and desire to secure by Letters Patent is:

I claim:

1. A rotatable friction joint comprising a female member provided with a cylindrical socket, a male member provided with a cylindrical plug seated in the socket, said plug having a reduced cylindrical portion terminating in spaced apart shoulders, a generally semi-cylindrical resilient member located between the shoulders and partially embracing the reduced cylindrical portion of the plug, said resilient member having an expanded central portion resiliently bearing against an area of the inner surface of the socket, said resilient member also having end portions resiliently bearing against the reduced cylindrical portion at areas longitudinally spaced from the area engaged by the central portion, and said end portions being provided with marginal edges resiliently bearing against additional areas of the inner surface of the socket, the bearing areas serving to lock the members together and allow relative rotational movement between the female and male members.

2. A rotatable friction joint comprising a female member provided with a cylindrical socket, a male member provided with a cylindrical plug seated in the socket, said plug having a reduced cylindrical portion terminating in spaced apart shoulders, a pair of generally semi-cylindrical resilient members located between the shoulders and partially embracing the reduced cylindrical portion of the plug, each of said resilient members having an expanded central portion resiliently bearing against an area of the inner surface of the socket, each of said resilient members also having end portions resiliently bearing against the reduced cylindrical portion at areas longitudinally spaced from the area engaged by the central portions of the resilient members, and said end portions of said resilient members being provided with marginal edges resiliently bearing against additional areas of the inner surface of the socket, the bearing areas serving to lock the members together and allow relative rotational movement between the female and male members.

(References on following page)

References Cited in the file of this patent

UNITED STATES PATENTS

| Number | Name | Date |
|---|---|---|
| 123,584 | Shriver | Feb. 13, 1872 |
| 658,621 | Dalzell | Sept. 25, 1900 |
| 662,748 | Wood | Nov. 27, 1900 |
| 738,503 | Waters | Sept. 8, 1903 |
| 1,083,697 | Neptune | Jan. 6, 1914 |
| 1,208,839 | Salfisberg | Dec. 19, 1916 |
| 1,409,685 | Dormandy | Mar. 14, 1922 |
| 1,423,244 | Moore | July 18, 1922 |
| 1,425,190 | Fitzgerald | Aug. 8, 1922 |
| 1,572,770 | Colley | Feb. 9, 1926 |
| 1,776,646 | Wilson | Sept. 23, 1930 |
| 1,794,638 | Mueller | Mar. 3, 1931 |
| 1,811,823 | Horton | June 23, 1931 |
| 1,980,149 | Zink | Nov. 6, 1934 |
| 2,003,856 | Gimbel | June 4, 1935 |
| 2,062,646 | Fox | Dec. 1, 1936 |
| 2,089,463 | Ritz-Woller | Aug. 10, 1937 |
| 2,111,641 | Ritz-Woller | Mar. 22, 1938 |
| 2,138,808 | Putterman et al. | Nov. 29, 1938 |
| 2,157,613 | La Hodny | May 9, 1939 |
| 2,176,405 | Lombard | Oct. 17, 1939 |
| 2,249,872 | Turner | July 22, 1941 |
| 2,263,543 | Murphy | Nov. 18, 1941 |
| 2,334,039 | Rueb | Nov. 9, 1943 |
| 2,338,780 | Poncher et al. | Jan. 11, 1944 |
| 2,344,808 | Duffield et al. | Mar. 21, 1944 |
| 2,419,306 | Zeiler | Apr. 22, 1947 |
| 2,431,238 | Friedman | Nov. 18, 1947 |
| 2,493,886 | Lutolf | Jan. 10, 1950 |
| 2,495,209 | Chilo | Jan. 24, 1950 |
| 2,502,925 | Case | Apr. 4, 1950 |

FOREIGN PATENTS

| Number | Country | Date |
|---|---|---|
| 383,271 | France | Mar. 2, 1908 |
| 462,554 | Germany | July 12, 1928 |